(12) United States Patent
Yamada et al.

(10) Patent No.: US 7,313,306 B2
(45) Date of Patent: Dec. 25, 2007

(54) FIBER LASER, SPONTANEOUS EMISSION LIGHT SOURCE AND OPTICAL FIBER AMPLIFIER

(75) Inventors: Makoto Yamada, Tokyo (JP); Shinichi Aozasa, Atsugi (JP); Tadashi Sakamoto, Atsugi (JP); Atsushi Mori, Atsugi (JP); Kouji Shikano, Hakodate (JP); Makoto Shimizu, Mito (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 78 days.

(21) Appl. No.: 10/530,133

(22) PCT Filed: Jul. 27, 2004

(86) PCT No.: PCT/JP2004/010660

§ 371 (c)(1),
(2), (4) Date: Apr. 4, 2005

(87) PCT Pub. No.: WO2005/011073

PCT Pub. Date: Feb. 3, 2005

(65) Prior Publication Data

US 2006/0050367 A1 Mar. 9, 2006

(30) Foreign Application Priority Data

Jul. 28, 2003 (JP) ............................. 2003-281212

(51) Int. Cl.
*G02B 6/02* (2006.01)
*H01S 3/067* (2006.01)
*H01S 3/091* (2006.01)

(52) U.S. Cl. ..................... 385/123; 359/341.5; 372/6

(58) Field of Classification Search .............. 359/341.5
See application file for complete search history.

(56) References Cited

U.S. PATENT DOCUMENTS 4,967,416 A    10/1990    Esterowitz et al.

FOREIGN PATENT DOCUMENTS

JP    03-293788    12/1991

(Continued)

OTHER PUBLICATIONS

L. Esterowitz et al., *Pulsed Laser Emission at 2-3 μm In a Thulium-Doped Fluorozirconate Fibre*, Electronics Letters, vol. 24, No. 17, Aug. 18, 1988, pp. 1104.
J.Y. Allain et al., *Tunable CW Lasing Around 0•82, 1•48, 1•88 and 2•35 μm in Thulium-Doped Fluorozirconate Fibre*, Electronics Letters, vol. 25, No. 24, Nov. 23, 1989, pp. 1660-1662.

(Continued)

*Primary Examiner*—Michelle Connelly-Cushwa
*Assistant Examiner*—Jerry T. Rahil
(74) *Attorney, Agent, or Firm*—Workman Nydegger

(57) ABSTRACT

New fiber lasers, spontaneous emission sources, and optical fiber amplifiers are provided. Their conventional counterparts, which have a fiber doped with thulium (Tm) ions and excited by 0.67 μm or 0.8 μm pumping light, have a problem in that their characteristics are deteriorated with the elapse of time. The new fiber lasers, spontaneous emission sources, and optical fiber amplifiers use 1.2 μm light as pumping light. Alternatively, they use a pumping source for exciting the thulium from the lowest energy level $^3H_6$ to $^3H_5$ excitation level. As a more preferable configuration, they improve the emission efficiency at 2.3 μm band by disclosing Tm-doped host glass.

24 Claims, 15 Drawing Sheets

FOREIGN PATENT DOCUMENTS

| | | |
|---|---|---|
| JP | 04-180279 | 6/1992 |
| JP | 06-283798 | 10/1994 |
| JP | 2002-299731 | 10/2002 |

OTHER PUBLICATIONS

Atsushi Taniguchi et al., *1212 nm Pumping of 2 μm Tm-Ho-Codoped Silica Fiber Laser*, Applied Physics Letters, vol. 81, No. 20, Nov. 11, 2002, pp. 3723-3725.

P.R. Barber et al., *Infrared-induced Photodarkening in Tm-doped Fluoride Fibers*, Optics Letters, vol. 20, No. 21, Nov. 1, 1995, pp. 2195-2197.

R.M. Percival et al., *Highly Efficient and Tunable Operation of Two Colour Tm-Doped Fluoride Fibre Laser*, Electronics Letters, vol. 28, No. 7, Mar. 26, 1992, pp. 671-673.

Satomi Sumiyoshi, *Kokidochu Sekigal Fiber Laser*, Japanese Journal of Optics, vol. 28, No. 8, 1999, pp. 449-454 (with partial English translation).

FIBER LASER, SPONTANEOUS EMISSION LIGHT SOURCE AND OPTICAL FIBER AMPLIFIER

TECHNICAL FIELD

The present invention relates to a fiber laser, spontaneous emission light source, and optical fiber amplifier, and particularly to the fiber laser, spontaneous emission light source, and optical fiber amplifier that operate near a 2 µm band with using as the gain medium an optical fiber having a core or a cladding doped with a rare-earth element having a laser transition level.

BACKGROUND ART

FIG. 1 is an energy level diagram of a thulium ion (see, non-patent document 1). In FIG. 1, energy values are shown on the right side of individual energy levels, and names of the individual levels are shown on the left side of the individual energy levels. Numerals added to arrows indicate wavelengths of light lasored (corresponding to upward arrows (not shown in FIG. 1)) or emitted (corresponding to downward arrows in FIG. 1) when transitions of the individual arrows occur. Here, the unit of the energy is represented by 1/cm (corresponding to Kayser in terms of spectroscopy) based on the unit of the wave number, and the name of the energy levels are based on the Russell-Saunders notational system. In addition, alphabetical capitlas represent a compound orbit angular momentum, superscript index digits added to them represent the multiplicity of the spectra term based on electronic total spin angular momentum, and subscript index digits added to them represent the total angular momentum. Here, each level is the level having an expanded width because of the segmentation of degeneration levels by the Starke effect caused by crystal electric field.

As for a fiber having its core doped with thulium (Tm), applications to fiber lasers, spontaneous emission sources, or optical fiber amplifiers have been studied employing the following bands of the thulium ion in FIG. 1:

1.9 µm band using $^3H_4 \rightarrow ^3H_6$ transition (which represents the transition of the thulium ion energy from the $^3H_4$ level to the $^3H_6$ level. This notational system will be used from now on);

2.3 µm band using $^3F_4 \rightarrow ^3H_5$ transition;

0.82 µm band using $^3F_4 \rightarrow ^3H_6$ transition; and 1.48 µm band using $^3F_4 \rightarrow ^3H_4$ transition.

Incidentally, to implement the fiber lasers, spontaneous emission sources, or optical fiber amplifiers at a high efficiency between the transitions above-mentioned, fluoride fibers are used as fibers to which Tm (thulium) is added. Among the Tm-doped fluoride fibers, the 2.3 µm band, in particular, is difficult to oscillate by semiconductor lasers, has hidden potential to become a huge business, and attracts great attention as a light source for noninvasive blood glucose level sensing which many foreign and domestic medical inspection instrument developers compete fiercely to develop.

Up to now, the following have been reported:

(1) Laser oscillation at 0.82 µm band, 1.48 µm band, 1.9 µm band and 2.35 µm band implemented by applying 0.67 µm band excitation (excitation of the thulium ions at the $^3H_6$ level to the $^3F_3$ level) to the Tm-doped fluoride fiber (see, non-patent document 1);

(2) Laser oscillation at 2.35 µm band implemented by applying 0.8 µm band excitation (excitation of the thulium ions from the $^3H_6$ level to the $^3F_4$ level) to the Tm-doped fluoride fiber (see, non-patent document 2 or patent document 1);

(3) Laser oscillation at 0.82 µm band, 1.48 µm band, 1.9 µm band and 2.35 µm band implemented by applying 0.8 (0.79) µm band excitation to the Tm-doped fluoride fiber (see, patent document 1);

(4) Laser oscillation and an optical fiber amplifier at 1.9 µm band implemented by applying 1.55–1.75 µm band excitation, excitation of the thulium ions from the $^3H_6$ level to the $^3H_4$ level, to the Tm-doped fluoride fiber (see, patent document 2); and (5) Laser oscillation and an optical fiber amplifier at 1.48 µm band implemented by applying 1.06 µm band excitation to the Tm-doped fluoride fiber (see, patent document 2).

The 2.3 µm band fiber lasers have already been developed as described in the foregoing reports (1), (2) and (3).

Patent Document 1: Japanese Patent Application Laid-open No. 3-293788 (1991);

Patent Document 2: Japanese Patent Application Laid-open No. 6-283798 (1994);

Non-Patent Document 1: J. Y. Allain et al., "Tunable CW lasing around 0.82, 1.48, 1.88 and 2.35 µm in Thulium-doped fluorozirconate fiber" Electron. Lett., Vol. 25, No. 24, pp. 1660–1662, 1989;

Non-Patent Document 2: L. Esterowitz et al., "Pulsed laser emission at 2.3 µm in a Thulium-doped florozirconate fiber", Electron. Lett., Vol. 24, No. 17, p. 1104, 1988;

Non-Patent Document 3: A. Taniguchi, et al., "1212-nm pumping of 2 µm Tm-Ho-codoped silica fiber laser", Appl. Phys. Lett., Vol. 81, No. 20, pp. 3723–3725, 2002; and Non-Patent Document 4: P. R. Barber, et al., "Infrared-induced photodarkening in Tm-doped fluoride fiber", Opt. Lett., Vol. 20 (21), pp. 2195–2197, 1995.

DISCLOSURE OF THE INVENTION

Problems to be Solved by the Present Invention

As for the 0.67 µm or 0.8 µm band excitation, however, only those that use Tm-doped fluoride fibers as their active medium are reported, and no reports have been presented about Tm-doped fibers that use other glass host (preform). In other words, it has not been disclosed up to now what kind of glass host fibers are suitable for the 2.3 µm band operation laser application.

Furthermore, launching high-intensity light with a wavelength equal to or less than 1.05 µm into a Tm-doped fluoride fiber brings about a phenomenon that causes photo darkening (see, non-patent document 4) that increases the loss of the fluoride fiber itself. FIG. 2 illustrates a loss spectrum (solid curves) before launching 1.047 µm band Nd-YLF laser beam of 500 mW into a Tm-doped fluoride fiber (with an additive density of 2000 wt. ppm, a fiber length of 20 m, and a relative refractive index difference of 3.7%), and a loss spectrum (broken curves) 56 hours after the launch of the laser beam. The loss increase of FIG. 2 is due to defects produced in the glass of the fluoride fiber by launching the laser beam into the fiber. The phenomenon becomes more conspicuous as the incident wavelength becomes short. Accordingly, considering the 2.3 µm band operation laser applications employing the Tm-doped fluoride fibers utilizing the 0.67 µm or 0.8 µm excitation, there arises a problem in the reliability in that the oscillation efficiency decreases with time, and finally the laser oscillation cannot be achieved. Accordingly, using such a conventional light source for the application to a noninvasive blood glucose evaluation equipment or the like cannot make a reliable, practical light source.

Incidentally, 1.9 μm and laser oscillation $Tm^{3+}$—$Ho^{3+}$-codoped fluoride fiber using the 1.2 μm and excitation has been reported (see, non-patent document 3). However, it does not utilize the laser transition of $Tm^{3+}$ from the $^3H_4$ to $^3H_6$ level, and hence has nothing to do with the light emission at the 2.3 μm and.

Means for Solving the Problems

The present invention is implemented to solve the foregoing problems. Therefore, main objects of the present invention are:

1) Disclosing glass hosts to be doped with Tm required for the 2.3 μm band operation, and certainly implementing a fiber laser, an amplified spontaneous emission (ASE) source, and a fiber amplifier positively which operate in that band; and 2) Implementing high reliability without degradation in the fiber characteristics due to the photo darkening.

To accomplish the foregoing objects, the present invention is characterized by the following two features.

1) As the glass hosts to be doped with Tm required for the 2.3 μm band operation, glass whose nonradiative relaxation rate due to the multi-phonon relaxation is less than that of silica glass is used.

2) As the excitation wavelength launched into the Tm-doped fiber for eliminating the degradation in the fiber characteristics due to the photo darkening, 1.2 μm band is used.

Because of these features, the present invention can carry out the application to practical equipments such as the noninvasive blood glucose evaluation equipment.

Advantageous Results of the Invention

The present invention can offer the following advantages because of the foregoing features:

1) It can positively implement the fiber laser, ASE source (spontaneous emission source) and optical fiber amplifier operating at the 2.3 μm band because it uses the glass whose nonradiative relaxation rate due to the multi-phonon relaxation is less than the nonradiative relaxation rate of the silica glass as the glass host to be doped with Tm; and 2) It can implement the highly reliable, practical fiber laser, ASE source and optical fiber amplifier operating at the 2.3 μm band with little degradation in the fiber characteristics due to the photo darkening because it utilizes the 1.2 μm band (1.2 μm band excitation) as the excitation wavelength to be launched into the Tm-doped fiber.

DESCRIPTION OF REFERENCE NUMERALS

Figure 1:
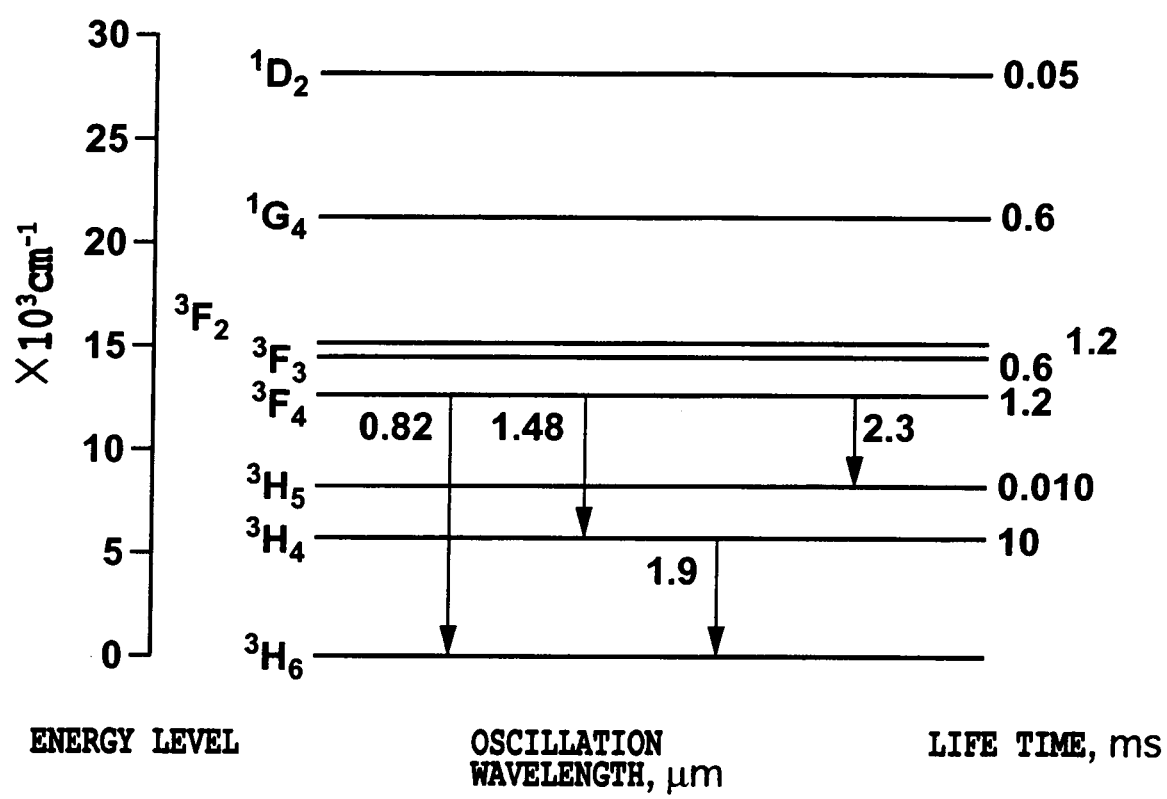
FIG. 1 is an energy level diagram of thulium ions.
Figure 2:
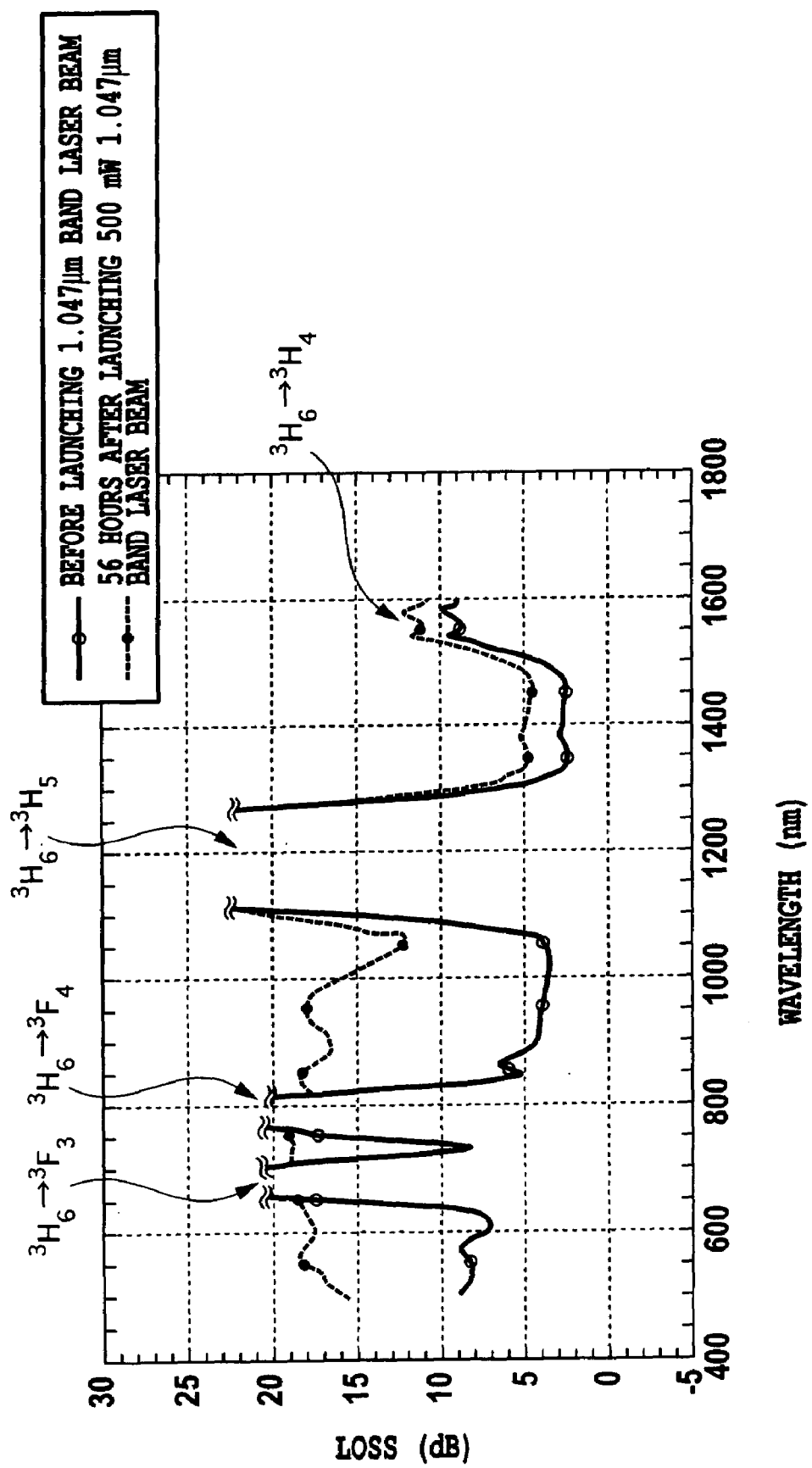
FIG. 2 is a graph illustrating photo darkening of a Tm-doped fluoride fiber.

1 $Tm^{3+}$-doped fiber as a gain medium,
2 1.2 μm band pumping source
3 dichroic mirror
4 reflecting mirror,
5 2.3 μm band and 1.8 μm band band-pass filter
6 condenser lens
7 total reflection mirror

BEST MODE FOR CARRYING OUT THE INVENTION

The best mode for carrying out the invention will now be described in detail in accordance with the foregoing distinctive features 1) and 2) of the present invention. (Description of Distinctive Feature 1 of the Present Invention)

Figure 3:
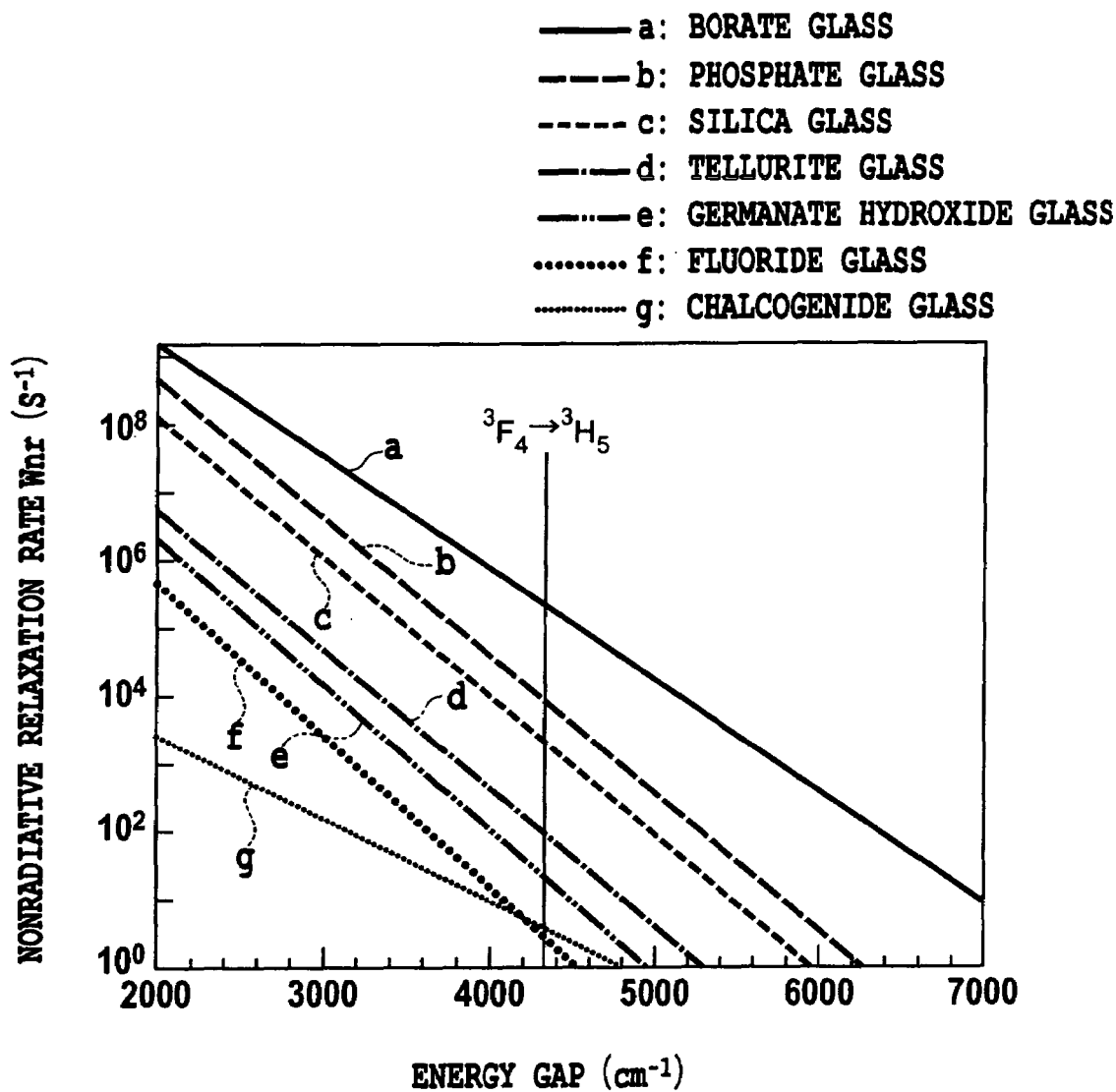
FIG. 3 is a graph illustrating characteristics of the nonradiative relaxation rates of various types of glass.

The fluorescence of an optical fiber doped with Tm at the 2.3 μm band is due to the laser transition from the $^3F_4$ to $^3H_5$ level as shown in FIG. 1. To implement the laser application based on the transition, it is necessary to lengthen the residence time of Tm ions staying at the $^3F_4$ level (that is, to prolong the life time of the fluorescence) to form the population inversion between the $^3F_4$ level and $^3H_5$ level. To achieve this, it is considered important to reduce the nonradiative relaxation of the Tm ions from the $^3F_4$ level to $^3H_5$ level. FIG. 3 illustrates characteristics of the nonradiative relaxation rates of a various types of glass. The nonradiative emission is caused by multi-phonon relaxation from the $^3F_4$ level to $^3H_5$ level. The energy difference between the $3F_4$ level and $^3H_5$ level is −4300 (1/cm). It is seen from FIG. 3 that tellurite glass, germanate hydroxide glass, fluoride glass, and chalcogenide glass have smaller nonradiative relaxation rates than silica glass. Although not shown in FIG. 3, bismuth based glass and fluorophosphate glass have smaller nonradiative relaxation rate than the silica glass. According to the knowledge, the inventors of the present invention fabricated Tm-doped optical fibers with different glass hosts, and measured 2.3 μm band spontaneous emission spectra of 0.67 μm band excitation and 0.8 μm band excitation, the results of which are FIGS. 4, 5 and 6.

The specifications of the optical fibers used here are as follows:

Tm-doped fluoride fiber: Tm additive density is 2000 wt. ppm, relative refractive index difference is 1.6%, cut off wavelength is 1.5 μm, and fiber length is 10 m;

Tm-doped tellurite fiber: Tm additive density is 2000 wt. ppm, relative refractive index difference is 2.5%, cut off wavelength is 1.4 μm, and fiber length is 10 m;

Tm-doped chalcogenide glass fiber: Tm additive density 2000 wt. ppm, relative refractive index difference is 1.0%, cut off wavelength is 1.5 μm, and fiber length is 5 m;

Tm-doped germanate hydroxide glass fiber: Tm additive density is 1500 wt. ppm, relative refractive index difference is 1.1%, cut off wavelength is 1.3 μm, and fiber length is 10 m;

Tm-doped silica fiber: Tm additive density is 1500 wt. ppm, relative refractive index difference is 1.8%, cut off wavelength is 1.2 μm, and fiber length is 10 m;

Tm-doped bismuth based glass fiber: Tm additive density is 1000 wt. ppm, relative refractive index difference is 2.5%, cut off wavelength is 1.43 μm, and fiber length is 3 m;

Tm-doped fluorophosphate glass fiber: Tm additive density is 2500 wt. ppm, relative refractive index difference is 1.1%, cutoff wavelength is 1.36 m, and fiber length is 3.5 m; and Tm-doped phosphate glass fiber: Tm additive density is 1800 wt. ppm, relative refractive index difference is 1.55%, cut off wavelength is 1.53 μm, and fiber length 2.9 m.

In addition, the pumping light intensity is 200 mW for the 0.67 μm band, and 150 mW for the 0.8 μm band.

Figure 4:
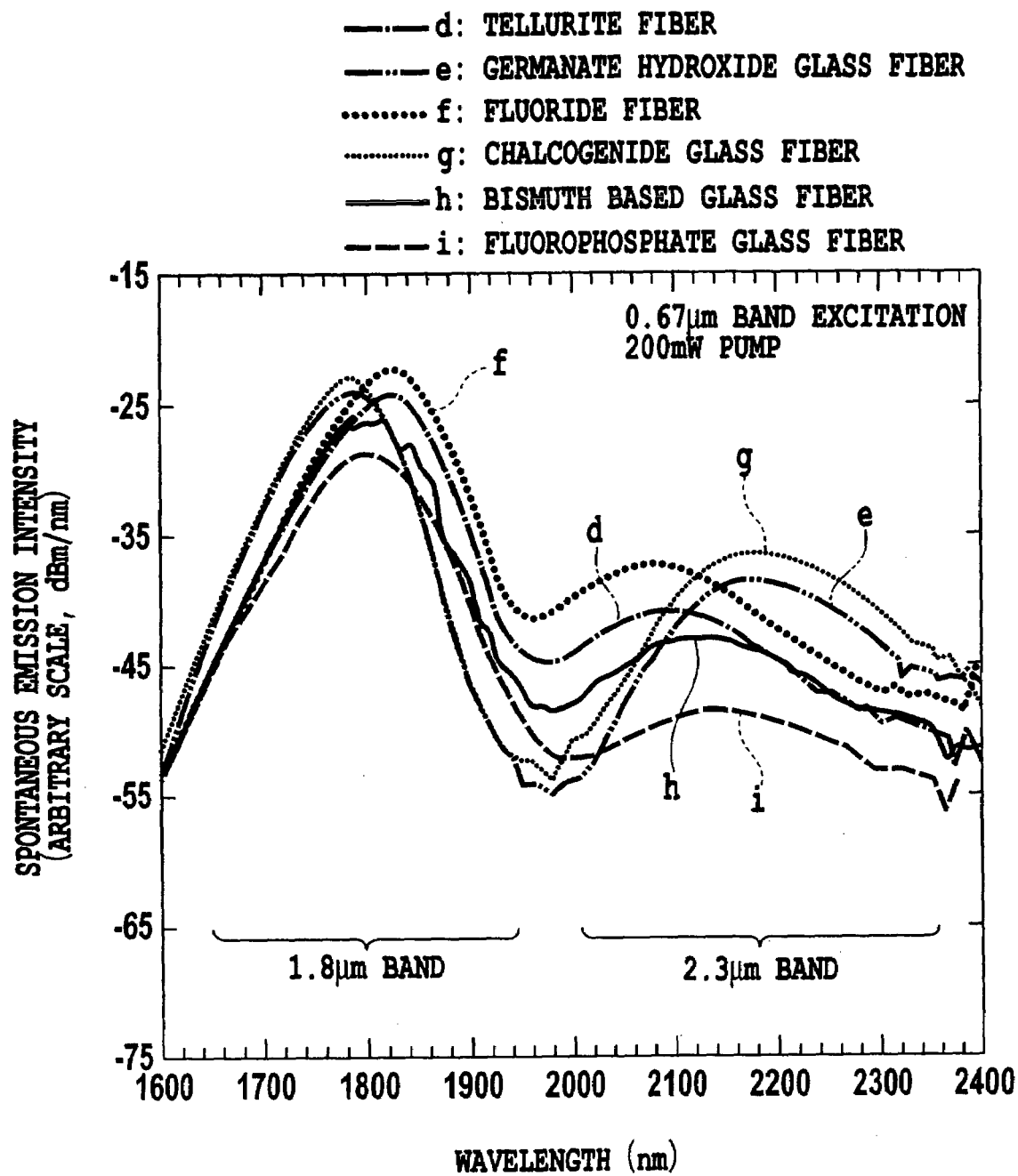
FIG. 4 is a graph illustrating 2.3 μm band spontaneous emission spectra based on 0.67 μm band excitation in accordance with the present invention.
Figure 5:
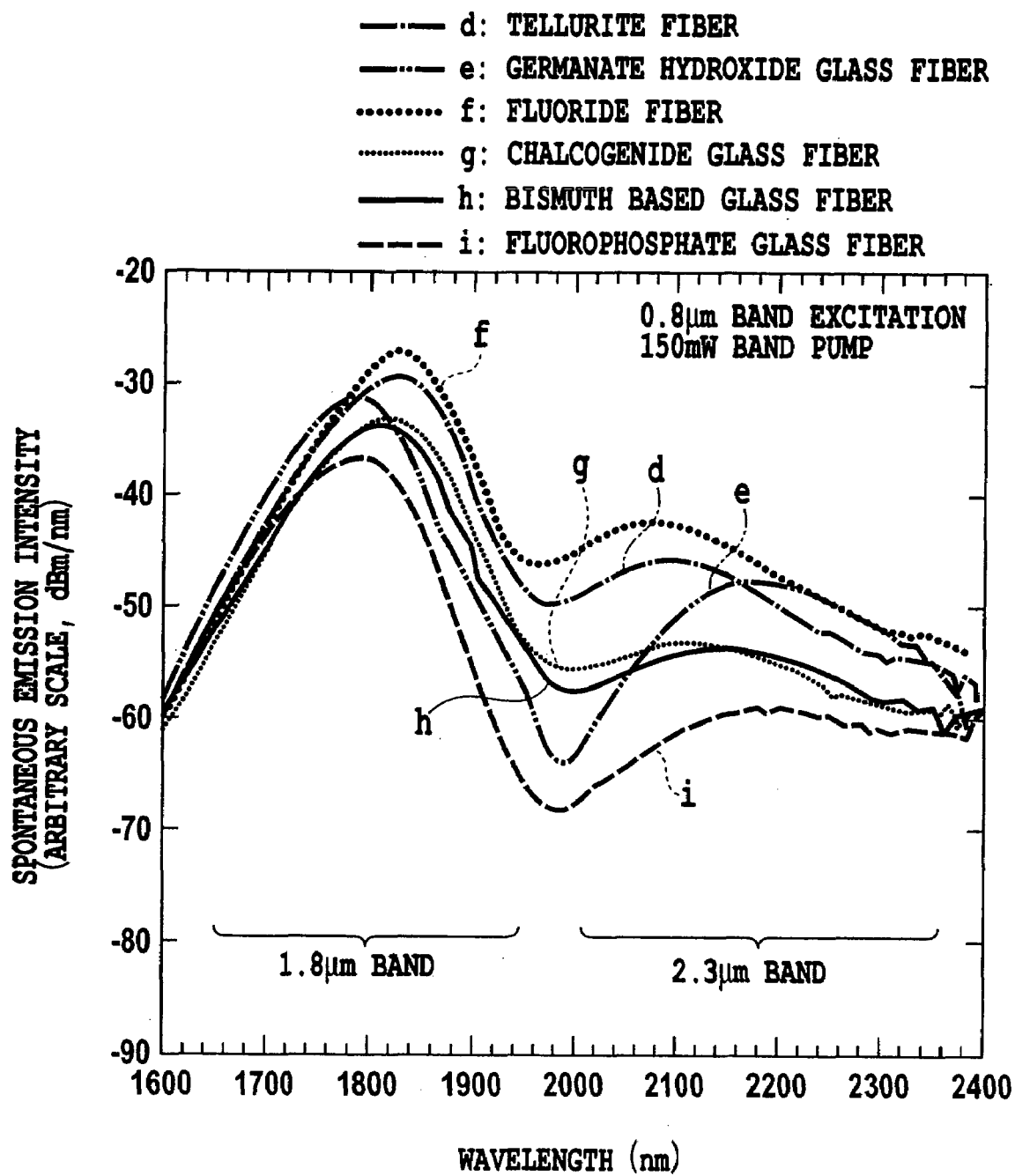
FIG. 5 is a graph illustrating 2.3 μm band spontaneous emission spectra based on 0.8 μm band excitation in accordance with the present invention.
Figure 6:
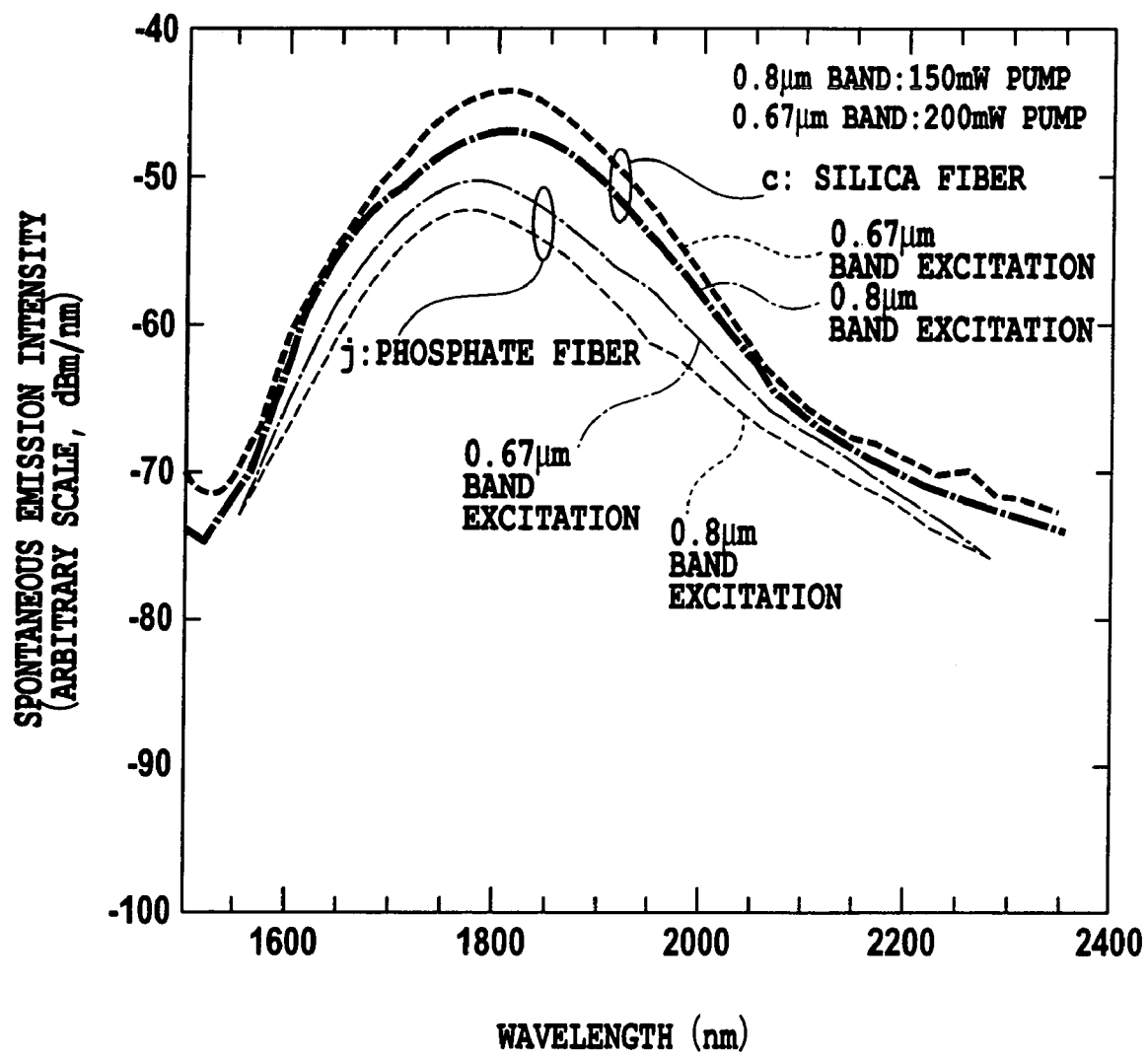
FIG. 6 is a graph illustrating 2.3 μm band spontaneous emission spectra based on 0.8 μm band excitation and 0.67 μm band excitation in accordance with the present invention.

The 2.3 μm band spontaneous emission was observed in the tellurite glass fiber, germanate hydroxide glass fiber, fluoride fiber, chalcogenide glass fiber, bismuth based glass fiber and fluorophosphate glass fiber which have smaller nonradiative relaxation rates than the silica glass as illustrated in FIGS. 4–6. On the other hand, the 2.3 μm band spontaneous emission was not observed in the phosphate glass fiber having a greater nonradiative relaxation rate than the silica based fiber or silica glass. This makes it clear that the 2.3 μm band fluorescence is achieved by optical fibers using, as the host glass, various types of glass with the smaller nonradiative relaxation rates than the silica glass caused by the multi-phonon relaxation. Thus, according to the fluorescence, it is clearly seen that the laser application in the 2.3 μm wavelength region is possible by using the glass having the smaller nonradiative relaxation rate than the silica glass caused by the multi-phonon relaxation as the Tm-doped glass host.

(Description of Distinctive Feature 2 of the Present Invention)

First, 2.3 μm band laser application (fiber laser, spontaneous emission source, and optical amplifier) according to the 1.2 μm band excitation to the Tm-doped fiber will be described. The 2.3 μm band laser application by this excitation is considered to be implemented by establishing population inversion between the $^3F_4$ level and $^3H_5$ level by exciting thulium ions from the $^3H_6$ lowest energy level to the $^3H_5$ level by 1.2 μm band excitation, followed by relaxation from that level to the $^3H_4$ level through nonradiative process, by excitation from the $^3H_4$ level to the $^3F_2$ level, and finally by relaxation of the thulium ions from the $^3F_2$ level to the $^3F_4$ level through the nonradiative process. (Incidentally, as for the implementation of the 2.3 μm band laser application (fiber laser, spontaneous emission source and optical amplifier) using the 1.2 μm band (1.2 μm band excitation) as the excitation wavelength launched into the Tm-doped fiber, there have been no reports up to now.)

Figure 7:
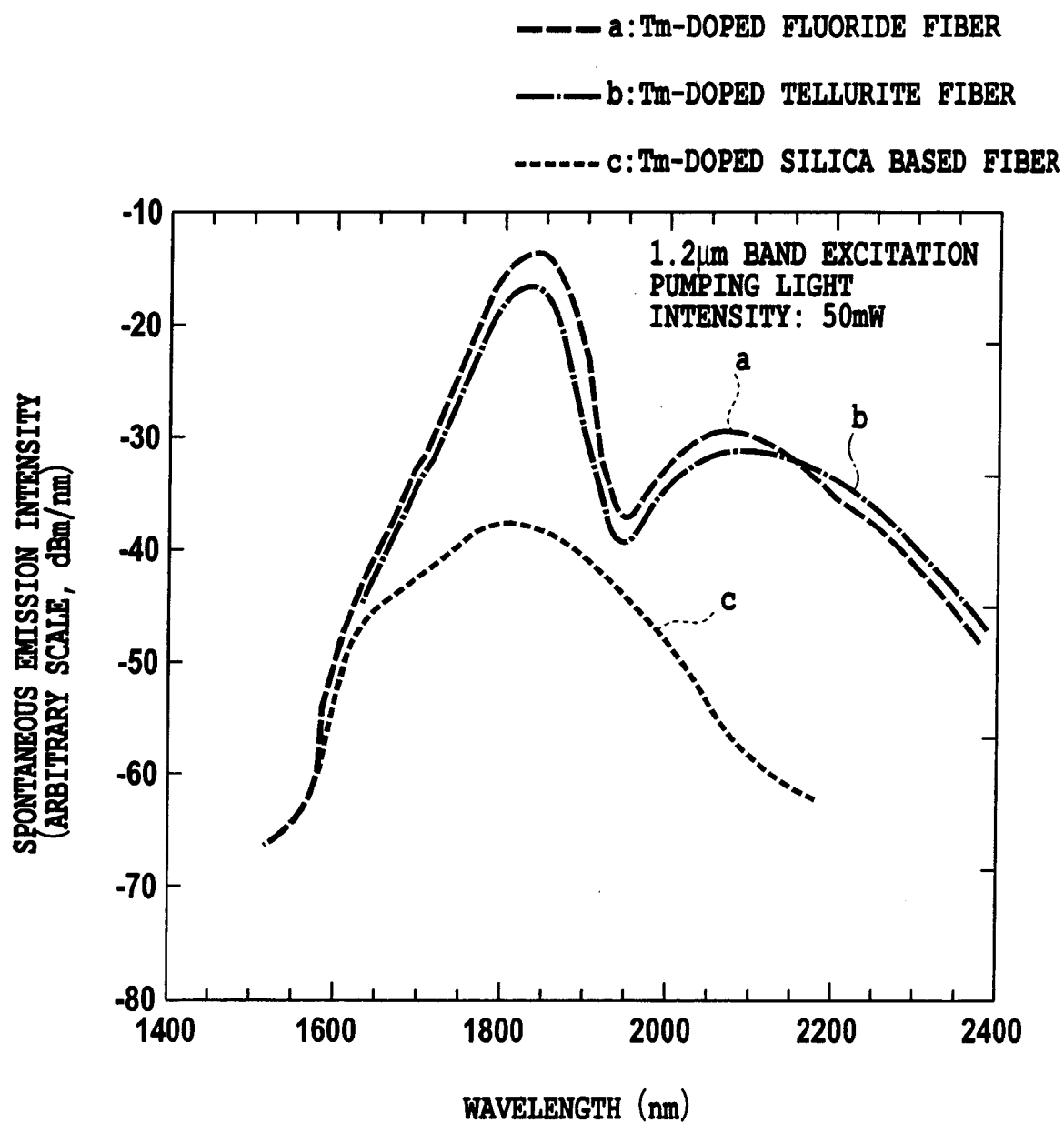
FIG. 7 is a diagram illustrating spontaneous emission spectra of a 1.2 μm band excitation $Tm^{3+}$-doped fluoride fiber and $Tm^{3+}$-doped tellurite fiber in accordance with the present invention.

FIG. 7 illustrates spontaneous emission spectra of the 1.2 μm band excitation $Tm^{3+}$-doped fluoride fiber and $Tm^{3+}$-doped tellurite fiber. It is seen from FIG. 7 that spontaneous emission spectra of 2.3 μm band caused by the transition $^3F_4$ level→$^3H_5$ level take place (although the fluorescence peaks are 2.05 μm, they are shifted by 1.2 μm band pumping light intensity). The fact that the 1.2 μm band pumping light intensity brings about the fluorescence at the 2.3 μm band by the Tm-doped fluoride fiber and Tm-doped tellurite glass fiber is new knowledge obtained by the present inventors, which has not been known before. The 2.3 μm band fluorescence cannot be observed with the Tm-doped silica based fiber.

Figure 8:
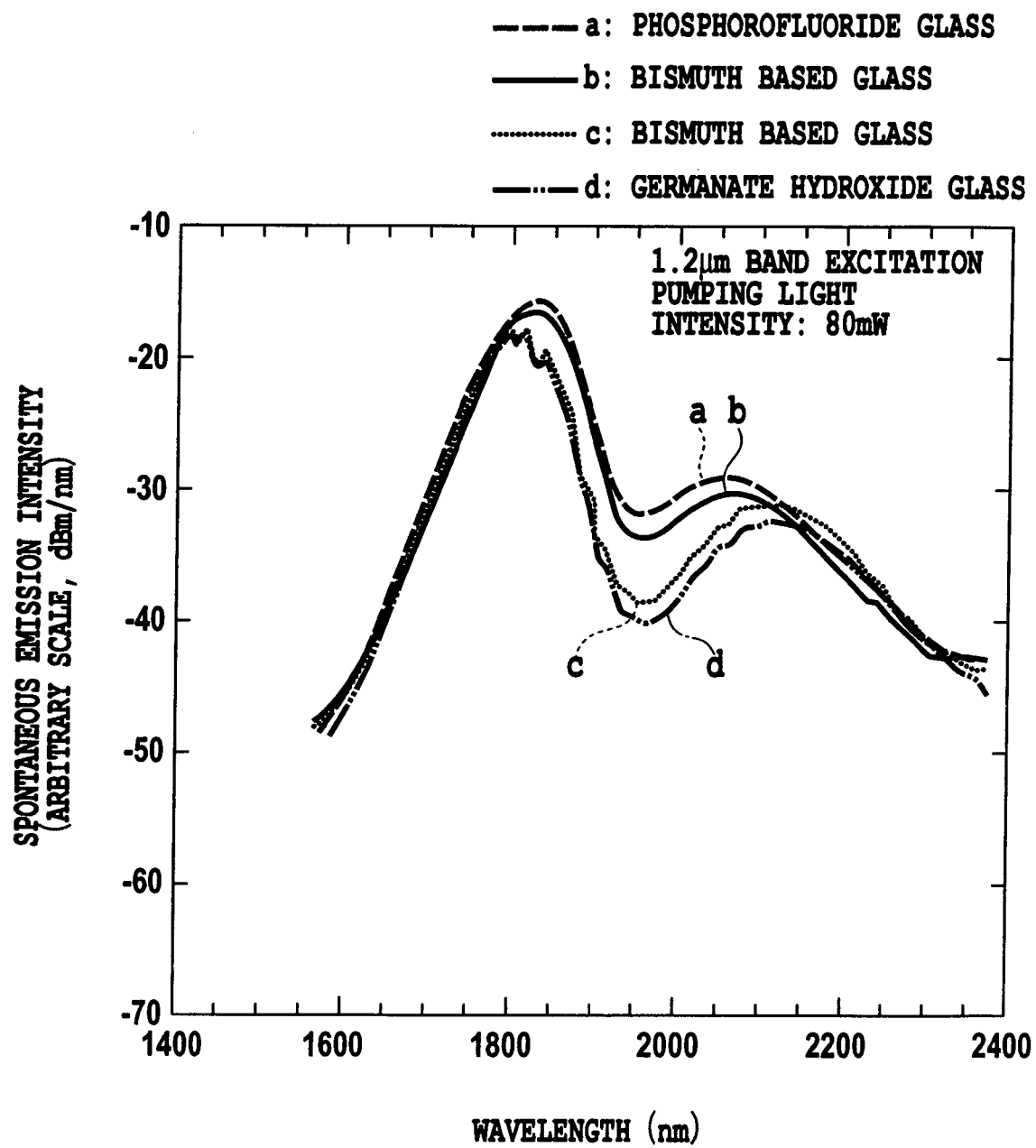
FIG. 8 is a graph illustrating spontaneous emission spectra of a 1.2 μm band excitation $Tm^{3+}$-doped germanate hydroxide glass fiber, $Tm^{3+}$-doped chalcogenide glass fiber, $Tm^{3+}$-doped bismuth based glass fiber and $Tm^{3+}$-doped fluorophosphate glass fiber in accordance with the present invention.

In addition, FIG. 8 illustrate spontaneous emission characteristics of a 1.2 μm band excitation $Tm^{3+}$-doped germanate hydroxide glass fiber, $Tm^{3+}$-doped chalcogenide glass fiber, $Tm^{3+}$-doped bismuth based glass fiber, and $Tm^{3+}$-doped fluorophosphate glass fiber. The characteristics are also new knowledge obtained by the present inventors just as those of the 1.2 μm band excitation $Tm^{3+}$-doped fluoride fiber and $Tm^{3+}$-doped tellurite fiber. Besides, the inventors disclose that the 2.3 μm band fluorescence is achieved by the 1.2 μm band excitation with the optical fibers using glass with a smaller nonradiative relaxation rate than the silica glass as the host glass, which is explained as the distinctive feature 1) of the present invention. In other words, this makes it clear that the 2.3 μm band laser application is possible by the 1.2 μm band excitation.

Incidentally, as for the $Tm^{3+}$-doped fluoride fiber using the 1.2 μm band excitation, there have been no reports. However, 1.9 μm band laser oscillation by a Tm-Ho codoped fiber into which both $Tm^{3+}$ and holmium (Ho) are doped is reported (see, non-patent document 3). The report, however, neither utilizes the laser transition of $Tm^{3+}$ from the $^3H_4$ to $^3H_5$ level, nor relates to the 2.3 μm band.

Figure 9:
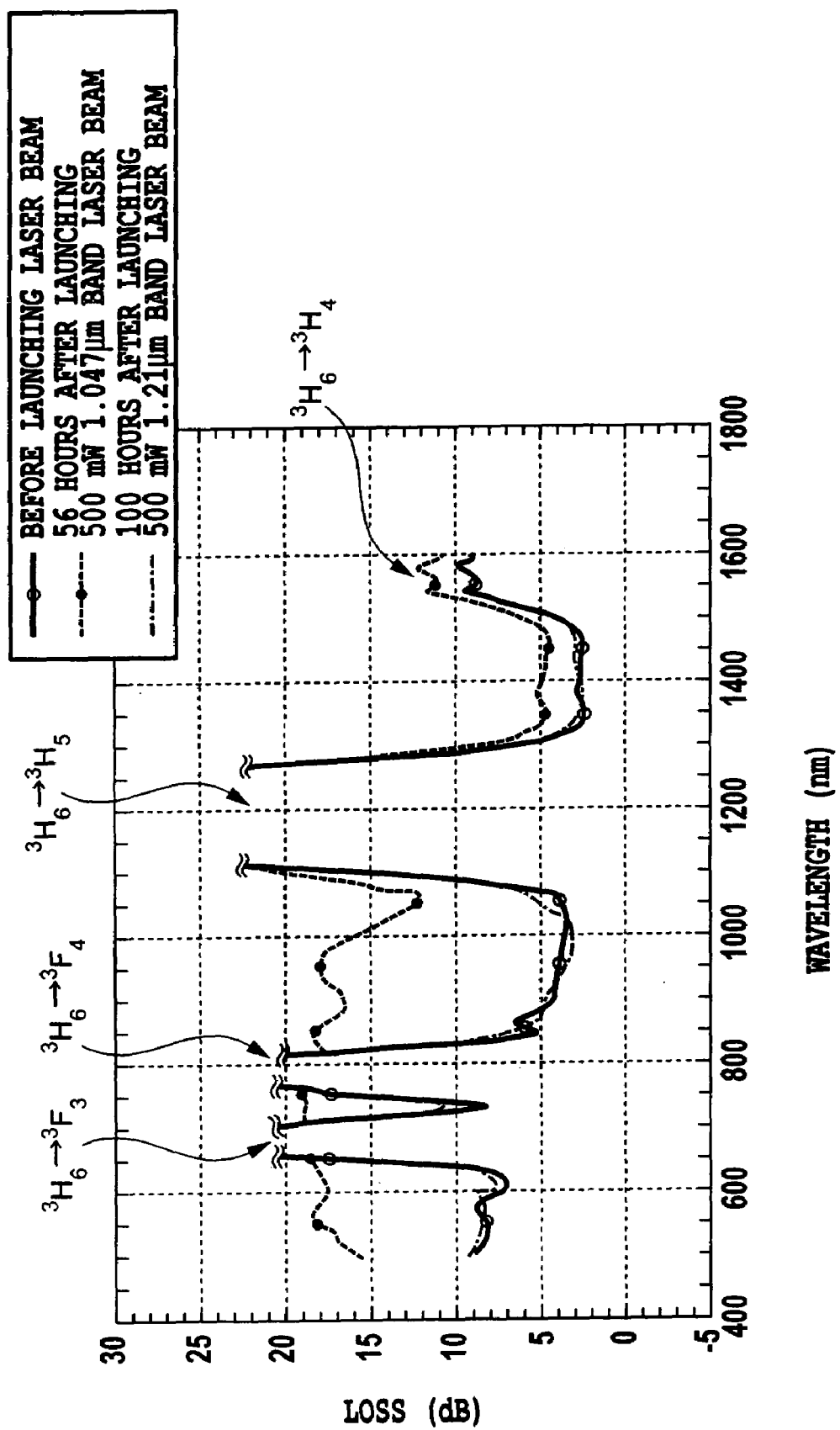
FIG. 9 is a graph illustrating efficacy of the 1.2 μm band excitation in accordance with the present invention.

Next, a method will be described of achieving more reliable fiber characteristics without degradation due to the photo darkening. FIG. 9 illustrates a loss spectrum (solid curves) before 1.21 μm band semiconductor LD (laser diode) light of about 500 mW is launched into a Tm-doped fluoride fiber (with an additive density of 2000 wt. ppm, a fiber length of 20 m, and a relative refractive index difference of 3.7%); and a loss spectrum (dash-dotted curves) 100 hours after launching that light. As seen from FIG. 9, employing the 1.2 μm band excitation can suppress the photo darkening that increases the loss of the fluoride fiber itself, thereby enabling the highly reliable, practical 2.3 μm band laser application. (In FIG. 9, although the spectrum before launching the pumping light differs slightly from the spectrum after launching the 1.21 μm band pumping light, the difference can be considered to be an error because of the measurement accuracy.) Furthermore, the following Table 1 shows the changes of the losses at the wavelength 600 nm between the 1.047 μm band excitation and 1.21 μm band excitation of the $Tm^{3+}$-doped tellurite fiber, $Tm^{3+}$-doped germanate hydroxide glass fiber, $Tm^{3+}$-doped chalcogenide glass fiber, $Tm^{3+}$-doped bismuth based glass fiber and $Tm^{3+}$-doped fluorophosphate glass fiber (which were measured using fibers with the specifications shown in the description of the distinctive feature 1) of the present invention). It is seen from the measurement results that the 1.2 μm band excitation is also effective for increasing the reliability of other glass fibers of the fluoride fiber.

TABLE 1

| Fibers | loss increase per unit length after 1.047 μm band excitation (500 mW, 56 hours) (wavelength 600 nm) (dB/m) | loss increase per unit length after 1.2 μm band excitation (500 mW, 100 hours) (wavelength 600 nm) (dB/m) |
|---|---|---|
| tellurite glass fiber | 0.81 | <0.01 |
| germanate hydroxide glass fiber | 0.92 | <0.01 |
| chalcogenide glass fiber | 0.77 | <0.01 |
| bismuth based glass fiber | 0.71 | <0.01 |
| fluorophosphate glass fiber | 0.85 | <0.01 |

The present invention will now be described in more detail with reference to the accompanying drawing. The embodiments in accordance with the present invention disclosed below, however, are only examples, and do not impose any limitations on the scope of the present invention.

EMBODIMENT 1

Figure 10:
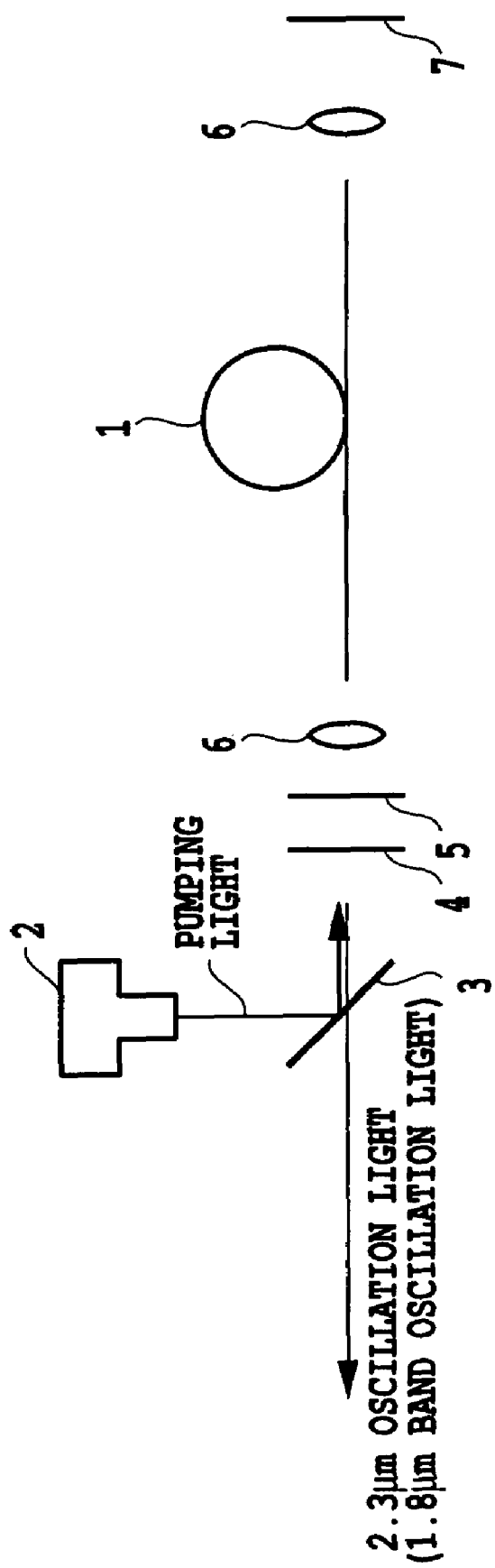
FIG. 10 is a schematic diagram showing a configuration of a fiber laser of a first embodiment in accordance with the present invention.
Figure 11A:
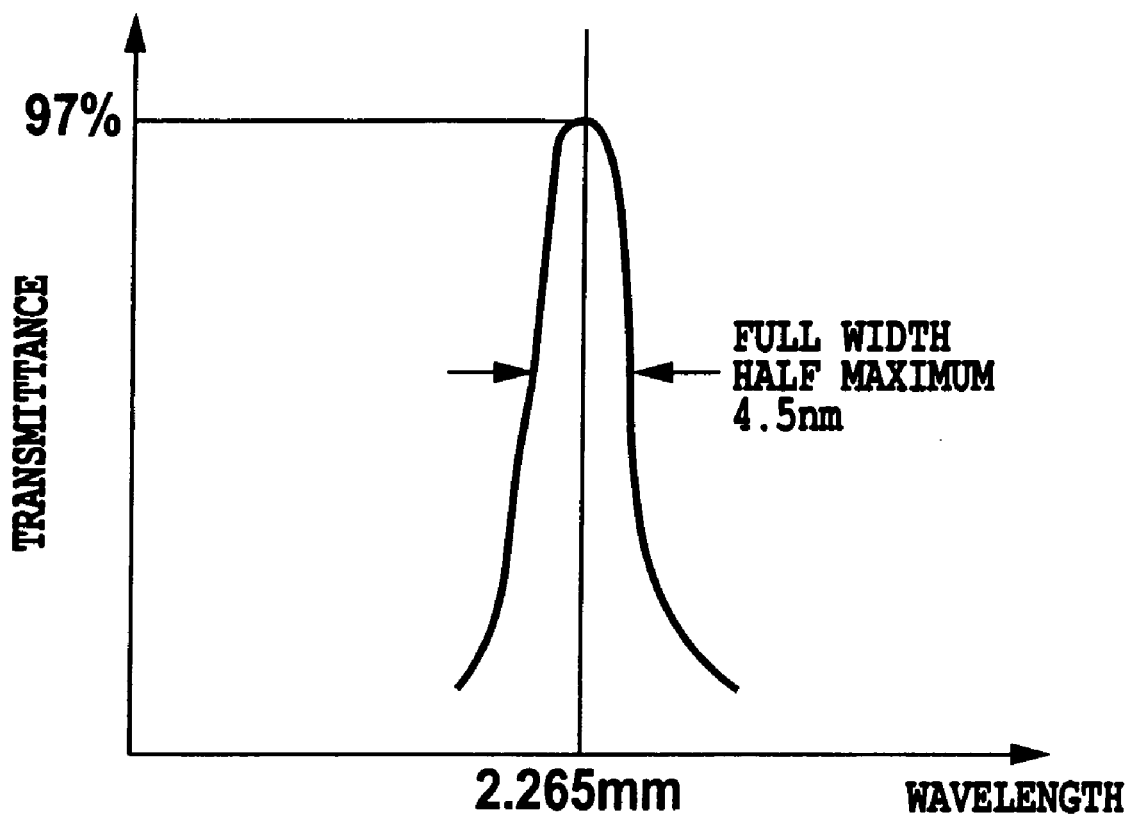
FIG. 11A is a graph illustrating characteristics of a 2.3 μm band-pass filter in the first embodiment in accordance with the present invention.
Figure 11B:
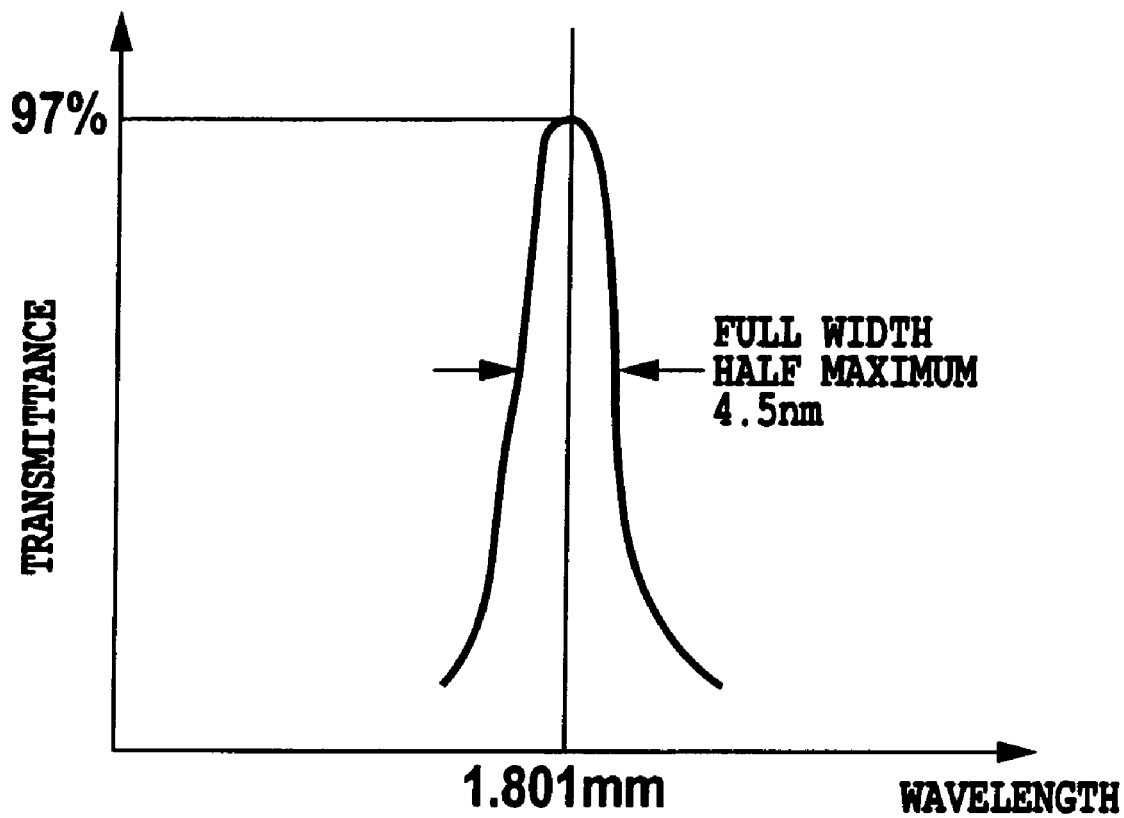
FIG. 11B is a graph illustrating characteristics of a 1.8 μm band-pass filter in the first embodiment in accordance with the present invention.

In the first embodiment in accordance with the present invention, applications of the present invention to the 2.3 μm band and 1.8 μm band fiber lasers will be described. FIG. 10 shows a configuration of the first embodiment in accordance with the present invention. In FIG. 10, the reference numeral 1 designates a $Tm^{3+}$-doped fiber serving as a gain medium; 2 designates a 1.2 μm band pumping source (consisting of a semiconductor laser with an oscillation wavelength of 1.21 μm, and a maximum output of 200 mW); 3 designates a dichroic mirror (that reflects 1.2 μm band light and transmits 1.6–2.4 μm band light); 4 designates a reflecting mirror (with the reflectance of 50% at 1.6–2.4 μm band, but transmits 100% of the 1.2 μm band light); 5 designates a 2.3 μm band and 1.8 μm band band-pass filter (with the transmission characteristics as illustrated in FIGS. 11A and 11B); 6 designates a condenser lens; and 7 designates a total reflection mirror (with the reflectance of 95% or more for 1.6–2.4 μm band light). As the $Tm^{3+}$-doped fiber 1, the following various types of the doped fibers were used one by one.

The specifications of the $Tm^{3+}$-doped fiber 1 used are as follows:

Tm-doped fluoride fiber: Tm additive density is 2000 wt. ppm, relative refractive index difference is 1.6%, cut off wavelength is 1.5 μm, and fiber length is 5 m;
Tm-doped tellurite fiber: Tm additive density is 2000 wt. ppm, relative refractive index difference is 2.5%, cut off wavelength is 1.4 μm, and fiber length is 5 m;
Tm-doped chalcogenide glass fiber: Tm additive density is 2000 wt. ppm, relative refractive index difference is 1.0%, cut off wavelength is 1.5 μm, and fiber length is 6 m;
Tm-doped germanate hydroxide glass fiber: Tm additive density is 1500 wt. ppm, relative refractive index difference is 1.1%, cut off wavelength is 1.3 μm, and fiber length is 5 m;
Tm-doped bismuth based glass fiber: Tm additive density is 1000 wt. ppm, relative refractive index difference is 2.5%, cut off wavelength is 1.43 μm, and fiber length is 4.5 m; and
Tm-doped fluorophosphate glass fiber: Tm additive density is 2500 wt. ppm, relative refractive index difference is 1.1%, cutoff wavelength is 1.36 μm, and fiber length is 5.5 m.

The 1.2 μm band pumping light intensity launched into each $Tm^{3+}$-doped fiber 1 was 50 mW, and when a 2.3 μm band band-pass filter (with a transmission central wavelength of 2.205 μm) was used as the band-pass filter 5, the following laser oscillations were achieved at 2.205 μm respectively: 1.5 mW when the Tm-doped fluoride fiber was used; 2.2 mW when the Tm-doped tellurite fiber was used; 0.6 mW when the Tm-doped chalcogenide glass fiber was used; 0.4 mW when the Tm-doped germanate hydroxide glass fiber was used; 1.3 mW when the Tm-doped bismuth based glass fiber was used; and 1.1 mW when the Tm-doped fluorophosphate glass fiber was used.

Furthermore, when the 1.2 μm band pumping light intensity launched into each Tm-doped fiber 1 was 50 mW, and when a 1.8 μm band band-pass filter (with a transmission central wavelength of 1.801 μm) was used as the band-pass filter 5, the following laser oscillations were achieved at 1.801 μm respectively: 2.4 mW when the Tm-doped fluoride fiber was used; 3.2 mW when the Tm-doped tellurite fiber was used; 0.8 mW when the Tm-doped chalcogenide glass fiber was used; 0.7 mW when the Tm-doped germanate hydroxide glass fiber was used; 1.9 mW when the Tm-doped bismuth based glass fiber was used; and 1.4 mW when the Tm-doped fluorophosphate glass fiber was used.

In addition, replacing the band-pass filter 5 by a tunable filter enables the laser oscillation at both the 2.3 μm band and 1.8 μm band. For example, using the Tm-doped fluoride fiber and the tunable filter it was possible to achieve the wavelength variable in the 1.75–2.21 μm band.

Figure 12:
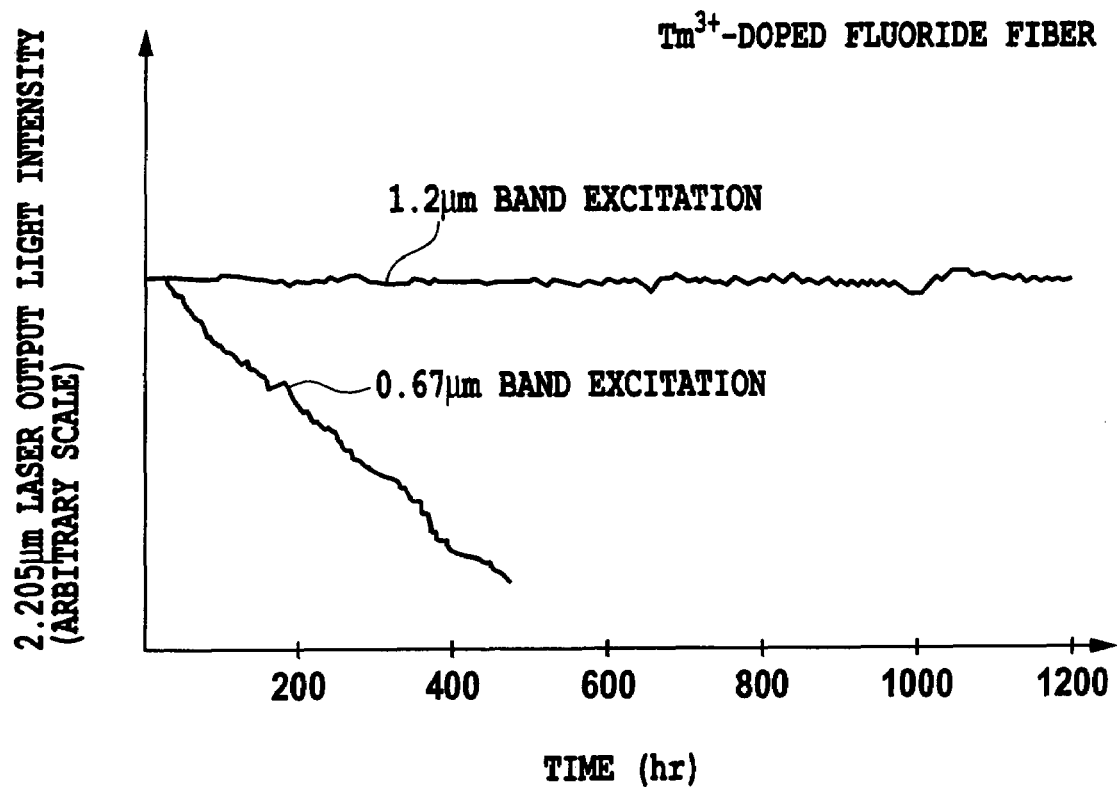
FIG. 12 is a graph illustrating output characteristics of the 2.3 μm band fiber laser of the first embodiment in accordance with the present invention.

FIG. 12 illustrates the time stability of the output light intensity of the fiber laser using the $Tm^{3+}$-doped fluoride fiber in the present embodiment (2.205 μm laser initial output is 1.5 mW). FIG. 12 also illustrates the characteristics at 0.67 μm band excitation (the same laser initial output as above). It was confirmed from these results that a highly reliable fiber laser application was possible by using the 1.2 μm band excitation.

In addition, when using the Tm-doped tellurite fiber, Tm-doped chalcogenide glass fiber, Tm-doped germanate hydroxide glass fiber, Tm-doped bismuth based glass fiber, and Tm-doped fluorophosphate glass fiber, variation in the laser output light intensity after 1000 hour operation were less than 10%, which made it clear that these glass fibers were also able to achieve the highly reliable fiber laser application by using the 1.2 μm band excitation.

EMBODIMENT 2

Figure 13:
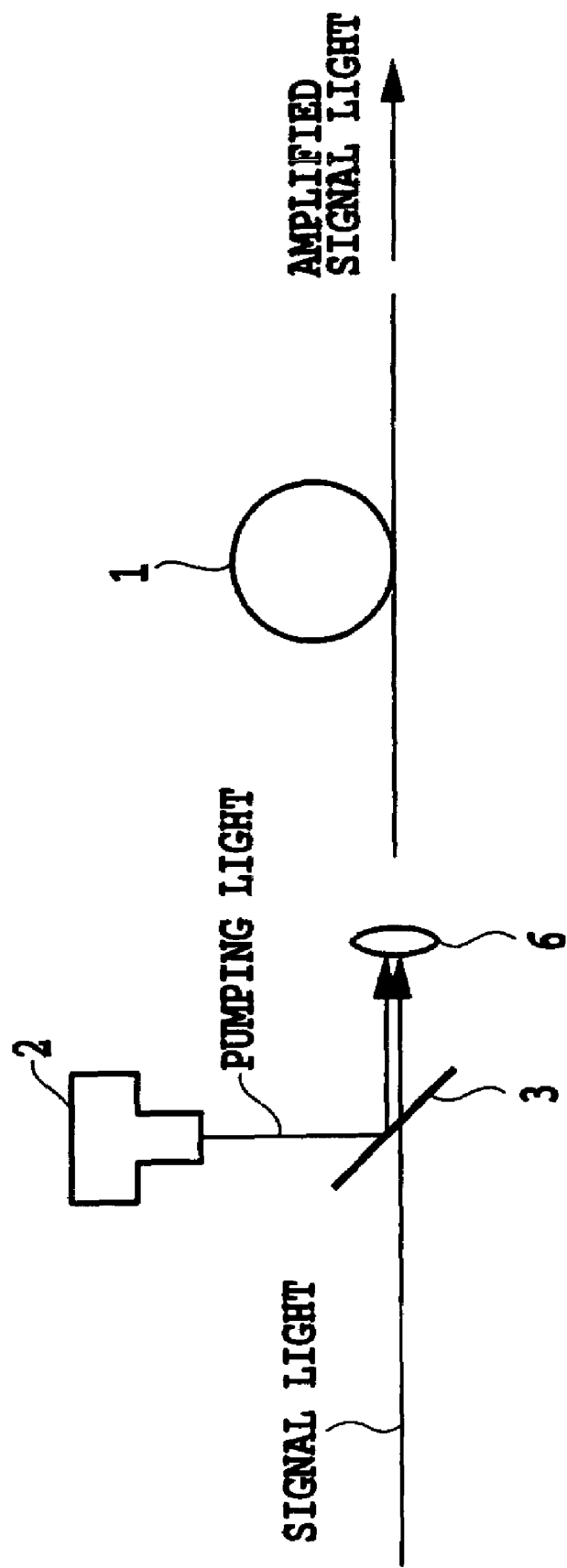
FIG. 13 is a schematic diagram showing a configuration of an optical fiber amplifier of a second embodiment in accordance with the present invention.

In the second embodiment in accordance with the present invention, application of the present invention to a 2.3 μm band optical fiber amplifier will be described. FIG. 13 shows a configuration of the second embodiment in accordance with the present invention. In FIG. 13, the reference numeral 1 designates a $Tm^{3+}$-doped fiber serving as a gain medium; 2 designates a 1.2 μm band pumping source (consisting of a semiconductor laser with an oscillation wavelength of 1.21 μm, and a maximum output of 200 mW); 3 designates a dichroic mirror (that reflects 1.2 μm band light and transmits 1.6–2.4 μm band light); and 6 designates a condenser lens.

Using the following fibers as the gain medium 1 was able to implement the following signal gains respectively:

- Using the Tm-doped fluoride fiber (with Tm additive density of 2000 wt. ppm, relative refractive index difference of 1.6%, and fiber length of 11 m) was able to achieve the signal gain of 8.3 dB for the 2.205 μm signal light (when the 1.2 μm band pumping light intensity was 62 mW);
- Using the Tm-doped tellurite fiber (with Tm additive density of 2000 wt. ppm, relative refractive index difference of 2.5%, and fiber length of 5 m) was able to achieve the signal gain of 5.8 dB for the 2.205 μm signal light (when the 1.2 μm band pumping light intensity was 52 mW);
- Using the Tm-doped chalcogenide glass fiber (with Tm additive density of 2000 wt. ppm, relative refractive index difference of 1.0%, and fiber length of 5 m) was able to achieve the signal gain of 3.8 dB for the 2.205 μm signal light (when the 1.2 μm band pumping light intensity was 75 mW);
- Using the Tm-doped germanate hydroxide glass fiber (with Tm additive density of 1500 wt. ppm, relative refractive index difference of 1.0%, and fiber length of 6 m) was able to achieve the signal gain of 2.7 dB for the 2.205 μm signal light (when the 1.2 μm band pumping light intensity was 73 mW);
- Using the Tm-doped bismuth based glass fiber (with Tm additive density of 1000 wt. ppm, relative refractive index difference of 2.5%, and fiber length of 5.5 m) was able to achieve the signal gain of 4.7 dB for the 2.205 m signal light (when the 1.2 μm band pumping light intensity was 55 mW); and
- Using the Tm-doped fluorophosphate glass fiber (with Tm additive density of 2500 wt. ppm, relative refractive index difference of 1.1%, and fiber length of 4.3 m) was able to achieve the signal gain of 2.2 dB for the 2.205 μm signal light (when the 1.2 μm band pumping light intensity was 86 mW).

In addition, when using the foregoing various types of Tm-doped fibers, the signal gains could also be achieved at the 1.8 μb and under the foregoing excitation conditions: when using the Tm-doped fluoride fiber, the laser oscillation of 6.2 dB was achieved (at wavelength 1.805 μm); when using the Tm-doped tellurite fiber, the laser oscillation of 5.1 dB was achieved (at wavelength 1.805 μm); when using the Tm-doped chalcogenide glass fiber, the laser oscillation of 3.2 dB was achieved (at wavelength 1.805 μm); when using the Tm-doped germanate hydroxide glass fiber, the laser oscillation of 3.2 dB was achieved (at wavelength 1.805 μm); when using the Tm-doped bismuth based glass fiber, the laser oscillation of 7.5 dB was achieved (at wavelength 1.805 μm); and when using the Tm-doped fluorophosphate glass fiber, the laser oscillation of 2.8 dB was achieved (at wavelength 1.805 μm).

EMBODIMENT 3

Figure 14:
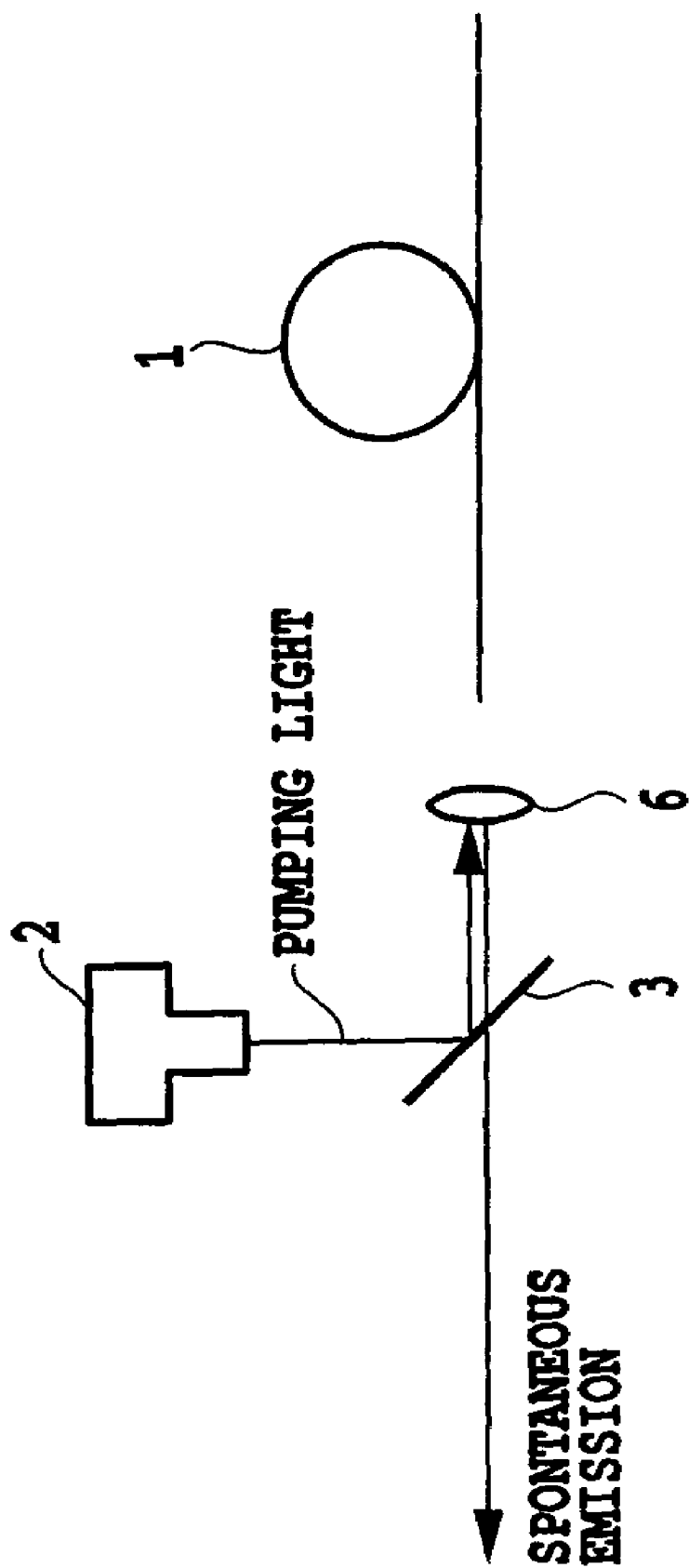
FIG. 14 is a schematic diagram showing a configuration of a spontaneous emission source of a third embodiment in accordance with the present invention.

In the third embodiment in accordance with the present invention, application of the present invention to a 2.3 μm band spontaneous emission source will be described. FIG. 14 shows a configuration of the third embodiment in accordance with the present invention. In FIG. 14, the reference numeral 1 designates a $Tm^{3+}$-doped fiber serving as a gain medium; 2 designates a 1.2 μm band pumping source (consisting of a semiconductor laser with an oscillation wavelength of 1.21 μm, and a maximum output of 200 mW); 3 designates a dichroic mirror (that reflects 1.2 μm band light and transmits 2.2 μm band light); and 6 designates a condenser lens.

The configuration of FIG. 14 enables the $Tm^{3+}$-doped fluoride fiber, $Tm^{3+}$-doped tellurite fiber, $Tm^{3+}$-doped germanate hydroxide glass fiber, $Tm^{3+}$-doped chalcogenide glass fiber, $Tm^{3+}$-doped bismuth based glass fiber and $Tm^{3+}$-doped fluorophosphate glass fiber to achieve the spontaneous emission characteristics as illustrated in FIGS. 7 and 8. The characteristics could implement the spontaneous emission source operating at the 2.3 μm band. In addition, it is seen from FIGS. 7 and 8 that the spontaneous emission can be used not only at the 2.3 μm band, but also at the 1.8 μm band.

OTHER EMBODIMENTS

Although the foregoing first to third embodiments employ the semiconductor laser as the pumping source, other light sources such as a 1.2 μm band fiber Raman laser are also applicable.

The present invention has been described by way of example of preferred embodiments. However, the embodiments in accordance with the present invention are not limited to the foregoing examples, and a variety modifications such as replacement, changes, addition, increase or decrease in the number, or the changes in the geometry of the components of the configuration are all included in the embodiments in accordance with the present invention as long as they fall within the scope of the claims.

INDUSTRIAL APPLICABILITY

Today, noninvasive blood glucose level sensing has hidden possibilities of a huge business, and many foreign and domestic medical inspection instrument developers compete fiercely to develop. In the noninvasive blood glucose level sensing, the 2.3 μm band is one of the promising glucose inspection wavelength bands, and this creates great demands for developing the light sources operating at that wavelength band. As for the light sources operating in the wavelength band, since the semiconductor LDs are difficult to oscillate in this band, fiber lasers or spontaneous emission sources using a Tm-doped fluoride fiber have been developed. However, since they use 0.67 μm or 0.8 μm less than 1.05 μm as the pumping light, the phenomenon that causes the photo darkening occurs, which presents a problem of reliability in that the 2.3 μm band output light decreases with time, and becomes zero at last. The present invention can implement the highly reliable, practical fiber laser, ASE source and optical fiber amplifier operating in the 2.3 μm band without degradation in the fiber characteristics due to the photo darkening, and hence is very useful.

The invention claimed is:

1. A fiber laser using as a gain medium an optical fiber that has a core or a cladding doped with a rare-earth element having a laser transition level, wherein said optical fiber is doped with at least thulium; and said fiber laser employs 1.2 μm band light as a pumping source, and operates at least at 2.3 μm band; and wherein said optical fiber doped with the thulium is a non-silica based fiber that uses glass having a nonradiative relaxation rate which is caused by multi-phonon relaxation and is less than a nonradiative relaxation rate of silica glass as host glass of the optical fiber.

2. The fiber laser as claimed in claim 1, using laser transition not only from $^3F_4$ to $^3H_5$ level, but also from $^3H_4$ to $^3H_6$ level.

3. The fiber laser as claimed in claim 1, operating in both 2.3 μm band and 1.8 μm and wavelength regions.

4. The fiber laser as claimed in claim 1, using laser transition at least from $^3F_4$ to $^3H_5$ level.

5. The fiber laser as claimed in claim 1, where said non-silica based fiber is one of a fluoride fiber, tellurite glass fiber, bismuth based glass fiber, fluorophosphate glass fiber, chalcogenide glass fiber, and germanate hydroxide glass fiber.

6. The fiber laser as claimed in claim 5, using laser transition at least from $^3F_4$ to $^3H_5$ level.

7. The fiber laser as claimed in claim 5, operating in both 2.3 μm band and 1.8 μm and wavelength regions.

8. The fiber laser as claimed in claim 5, using laser transition not only from $^3F_4$ to $^3H_5$ level, but also from $^3H_4$ to $^3H_6$ level.

9. A spontaneous emission source using as a gain medium an optical fiber that has a core or a cladding doped with a rare-earth element having a laser transition level,
wherein said optical fiber is doped with at least thulium; and said spontaneous emission source employs 1.2 μm and light as a pumping source, and operates at least at 2.3 μm band; and
wherein said optical fiber doped with the thulium is a non-silica based fiber which uses, as host glass of said optical fiber, glass having a nonradiative relaxation rate which is caused by multi-phonon relaxation and is lower than a nonradiative relaxation rate of silica glass.

10. The spontaneous emission source as claimed in claim 9, using laser transition at least from $^3F_4$ to $^3H_5$ level.

11. The spontaneous emission source as claimed in claim 9, operating in both 2.3 μm band and 1.8 μm and wavelength regions.

12. The spontaneous emission source as claimed in claim 9, using laser transition not only from $^3F_4$ to $^3H_5$ level, but also from $^3H_5$ to $^3H_6$ level.

13. The spontaneous emission source as claimed in claim 9, wherein said non-silica based fiber is one of a fluoride fiber, tellurite glass fiber, bismuth based glass fiber, fluorophosphate glass fiber, chalcogenide glass fiber, and germanate hydroxide glass fiber.

14. The spontaneous emission source as claimed in claim 13, using laser transition at least from $^3F_4$ to $^3H_5$ level.

15. The spontaneous emission source as claimed in claim 13, operating in both 2.3 μm band and 1.8 μm band wavelength regions.

16. The spontaneous emission source as claimed in claim 13, using laser transition not only from $^3F_4$ to $^3H_5$ level, but also from $^3H_4$ to $^3H_6$ level.

17. An optical fiber amplifier using as a gain medium an optical fiber that has a core or a cladding doped with a rare-earth element having a laser transition level,
wherein said optical fiber is doped with at least thulium; and said optical fiber amplifier employs 1.2 μm and light as a pumping source, and operates at least at 2.3 μm band; and
wherein said optical fiber doped with the thulium is a non-silica based fiber that uses glass having a nonradiative relaxation rate which is caused by multi-phonon relaxation and is lower than a nonradiative relaxation rate of silica glass as host glass of the optical fiber.

18. The optical fiber amplifier as claimed in claim 17, using laser transition at least from $^3F_4$ to $^3H_5$ level.

19. The optical fiber amplifier as claimed in claim 17, operating in both 2.3 μm band and 1.8 μm band wavelength regions.

20. The optical fiber amplifier as claimed in claim 17, using laser transition not only from $^3F_4$ to $^3H_5$ level, but also from $^3H_4$ to $^3H_6$ level.

21. The optical fiber amplifier as claimed in claim 17, where said non-silica based fiber is one of a fluoride fiber, tellurite glass fiber, bismuth based glass fiber, fluorophosphate glass fiber, chalcogenide glass fiber, and germanate hydroxide glass fiber.

22. The optical fiber amplifier as claimed in claim 21, using laser transition at least from $^3F_4$ to $^3H_5$ level.

23. The optical fiber amplifier as claimed in claim 21, operating in both 2.3 μm band and 1.8 μm and wavelength regions.

24. The optical fiber amplifier as claimed in claim 21, using laser transition not only from $^3F_4$ to $^3H_5$ level, but also from $^3H_4$ to $^3H_6$ level.

* * * * *